US012747150B2

(12) United States Patent
Diaz

(10) Patent No.: US 12,747,150 B2
(45) Date of Patent: Sep. 29, 2026

(54) LATERAL-CUTTING CAN OPENER WITH INTEGRATED LID REMOVAL FEATURE AND METHOD FOR USING SAME

(71) Applicant: Hamilton Beach Brands, Inc., Glen Allen, VA (US)

(72) Inventor: Paul Diaz, Glen Allen, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 0 days.

(21) Appl. No.: 18/811,330

(22) Filed: Aug. 21, 2024

(65) Prior Publication Data

US 2025/0066177 A1 Feb. 27, 2025

Related U.S. Application Data

(60) Provisional application No. 63/534,164, filed on Aug. 23, 2023.

(51) Int. Cl.

| | |
|---|---|
| ***B67B 7/00*** | (2006.01) |
| ***B67B 7/12*** | (2006.01) |
| ***B67B 7/20*** | (2006.01) |

(52) U.S. Cl.
CPC ................ *B67B 7/385* (2013.01); *B67B 7/12* (2013.01); *B67B 7/20* (2013.01)

(58) Field of Classification Search
CPC .............. B67B 7/20; B67B 7/12; B67B 7/385
See application file for complete search history.

(56) References Cited

U.S. PATENT DOCUMENTS

| | | | | |
|---|---|---|---|---|
| 4,860,455 A * | 8/1989 | Conneally | B67B 7/38 | 30/424 |
| 2007/0044326 A1* | 3/2007 | Sanders | B67B 7/34 | 30/401 |
| 2007/0175051 A1* | 8/2007 | Mah | B67B 7/34 | 30/401 |
| 2007/0180712 A1* | 8/2007 | Mah | B67B 7/32 | 30/418 |
| 2012/0047753 A1* | 3/2012 | Mah | B67B 7/385 | 30/418 |
| 2016/0368750 A1* | 12/2016 | Kalogroulis | B67B 7/44 | |

* cited by examiner

*Primary Examiner* — Anna K Kinsaul
(74) *Attorney, Agent, or Firm* — Alexander D. Raring

(57) ABSTRACT

An automated can opener includes a pry lip mounted to the lower surface of the housing and extending toward a drive gear. The pry lip configured to be inserted into a seam cut into the rim of the can.

11 Claims, 11 Drawing Sheets

LATERAL-CUTTING CAN OPENER WITH INTEGRATED LID REMOVAL FEATURE AND METHOD FOR USING SAME

FIELD OF THE INVENTION

The present application is directed generally devices and methods for opening a can.

BACKGROUND

Can openers have been known for many years and maybe roughly categorized into three types: a first type having a cutter blade which cuts directly into a can's top wall, a second type having a cutter blade which cuts into a can's side wall (e.g., below the rim), and a third type having a cutter blade which cuts partially into the rim of a can having a peripheral wall and ends joined by folding together edges of the wall and ends to form the rim. The second and third type are generally known as lateral-cutting can openers. Whether manually operated or automated, a lateral-cutting can opener includes a cutting tool able to laterally cut the rim or a side of a can. Cutting the side of the rim prevents the blade of the cutting tool from extending into the can to contaminate the food, plus the opened can and lid are typically free of sharp edges. As a result, lateral-cutting can openers may provide a clean uniform, smooth cut around the peripheral side of the can, ultimately enabling removal and reuse of the can lid, especially when an incision is made near the can's top wall. Thus, lateral-cutting can openers are often viewed as being safe and hygienic for use while preserving the food with ease.

One issue that can arise with lateral-cutting can openers is removal of the lid. Because the blade typically cuts the rim, rather than the top surface, of the can, the lid can sometimes "stick" in place and can be difficult to remove. Often the user will insert a fingernail into the seam created by the cutting blade and pry the lid from the remainder of the can. (Of course, the tendency to "stick" is one of the reasons that the lid can be replaced and reused).

In view of the foregoing, it may be desirable to provide a technique for easily removing the lid from the can when the can is opened with a lateral-cutting can opener.

SUMMARY

As a first aspect, embodiments of the invention are directed to an automated can opener. The can opener comprises: a housing having upper and lower surfaces; a cutting wheel rotatably mounted relative to and extending downwardly from the lower surface of the housing, the cutting wheel including a circumferential blade, the cutting wheel mounted to rotate about a first axis that is generally normal to the lower surface; a drive gear rotatably mounted relative to and extending downwardly from the lower surface of the housing, the drive gear forming a gap with the cutting wheel, the gap sized to receive a raised rim of a can; a drive system residing in the housing and coupled to the drive gear to rotate the drive gear about a second axis that is substantially normal to the lower surface; and a pry lip mounted to the lower surface of the housing and extending toward the drive gear, the pry lip configured to be inserted into a seam cut into the rim of the can.

As a second aspect, embodiments of the invention are directed to a method of opening an can, comprising:

(a) providing a can having a side wall, a lid, and a raised rim that encircles the lid, the raised rim having a circumferential outer surface;

(b) providing an automatic lateral cutting can opener, comprising:

a housing having upper and lower surfaces;

a cutting wheel rotatably mounted relative to and extending downwardly from the lower surface of the housing, the cutting wheel including a circumferential blade, the cutting wheel mounted to rotate about a first axis that is generally normal to the lower surface;

a drive gear rotatably mounted relative to and extending downwardly from the lower surface of the housing, the drive gear forming a gap with the cutting wheel, the gap sized to receive a raised rim of a can;

a drive system residing in the housing and coupled to the drive gear to rotate the drive gear about a second axis that is substantially normal to the lower surface; and a pry lip mounted to the lower surface of the housing and extending toward the drive gear, the pry lip configured to be inserted into a seam cut into the rim of the can.

(c) engaging the raised rim with the blade of the cutting wheel and the drive gear;

(d) revolving the can opener relative to the can to form a seam in the outer surface of the raised rim of the can;

(e) inserting the pry lip into the seam; and (f) raising the pry lip to dislodge the lid of the can from the side wall.

DETAILED DESCRIPTION

Figure 1:
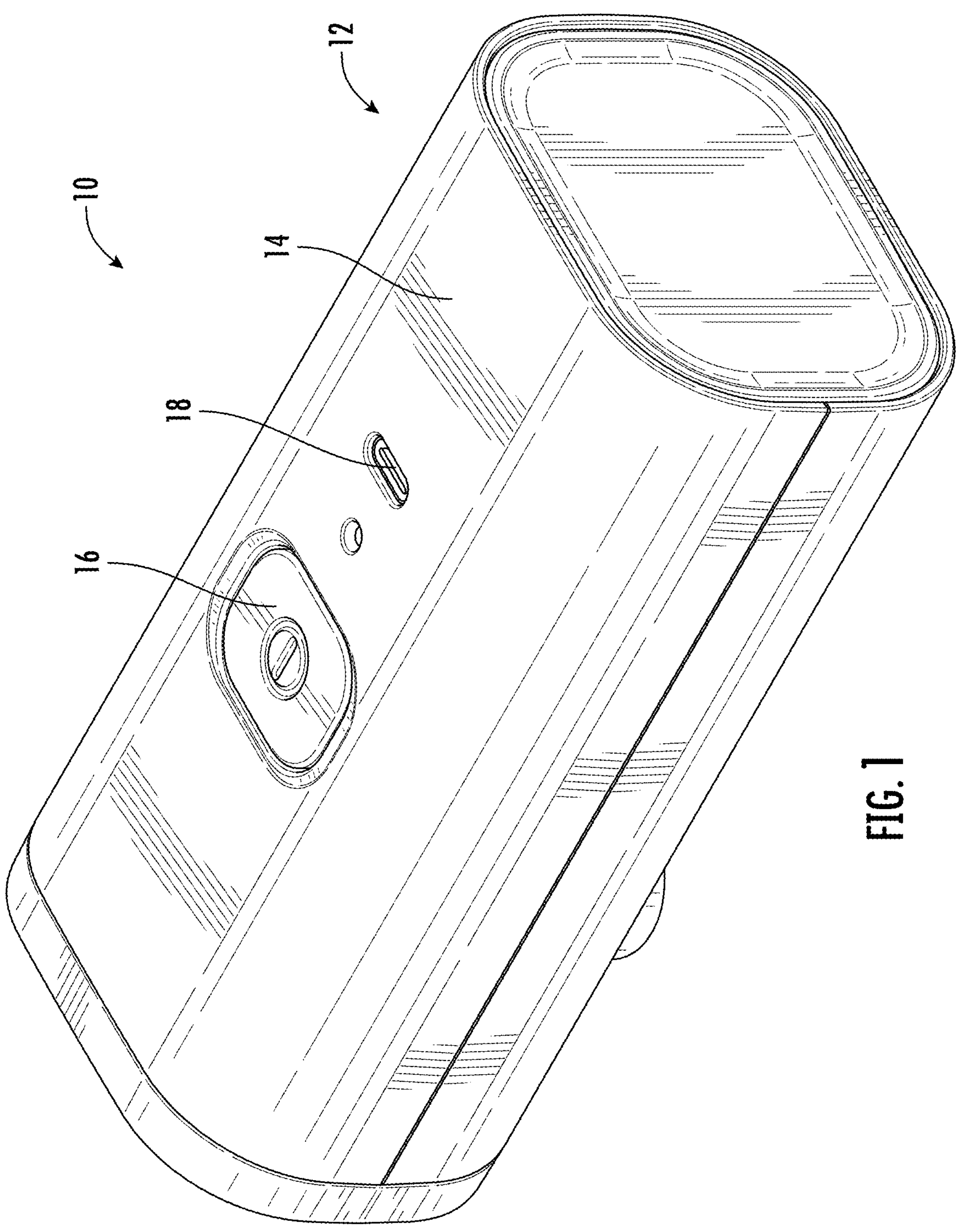
FIG. 1 is a perspective view of a lateral-cutting can opener according to embodiments of the invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises” and/or “comprising”, when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items.

As used herein, phrases such as “between X and Y” and “between about X and Y” should be interpreted to include X and Y. As used herein, phrases such as “between about X and Y” mean “between about X and about Y.” As used herein, phrases such as “from about X to Y” mean “from about X to about Y.”

Figure 2:
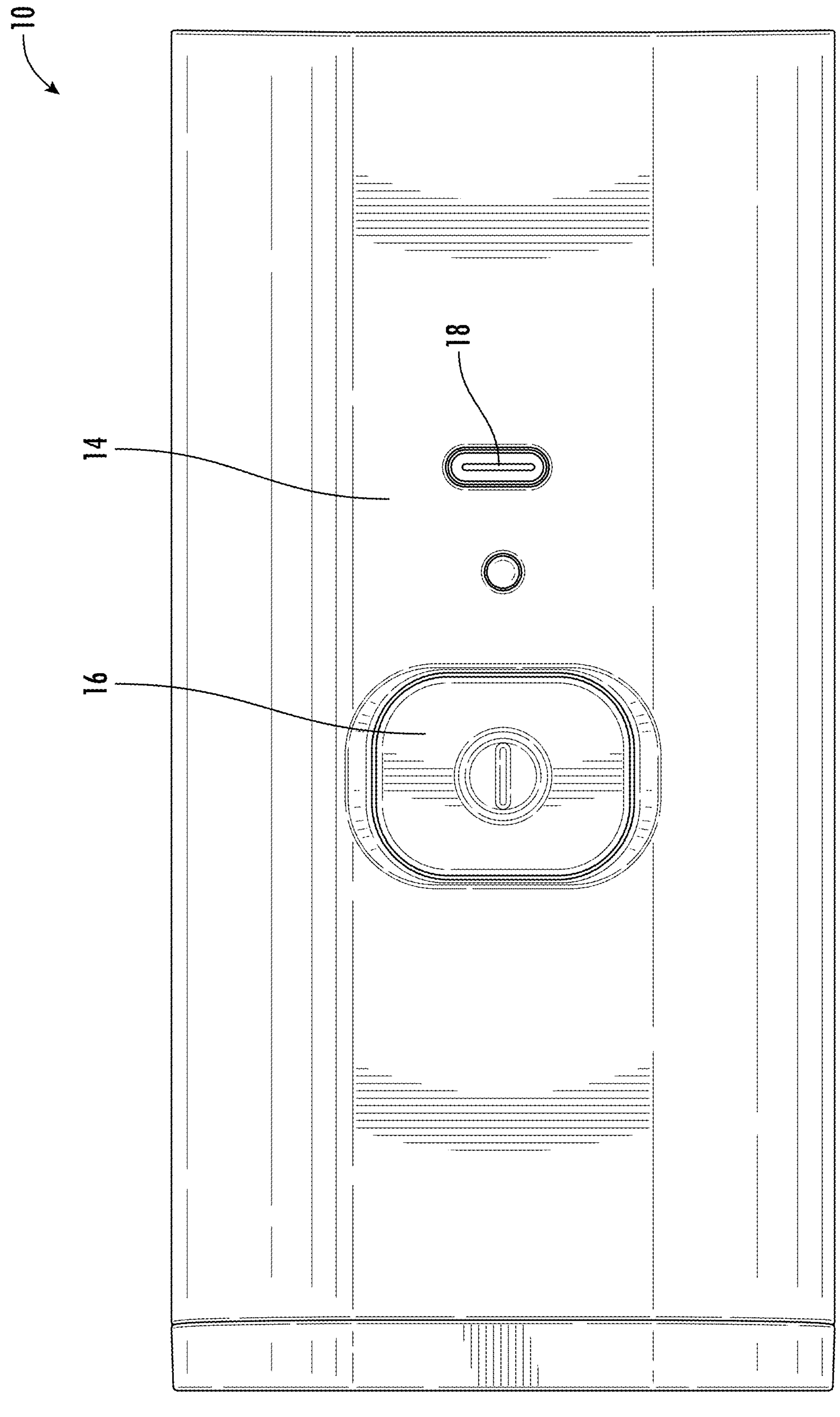
FIG. 2 is a top view of the can opener of FIG. 1.

Referring now to the figures, an automated lateral-cutting can opener, designated broadly at 10, is shown therein. Referring first to FIGS. 1 and 2, the can opener 10 includes a housing 12 that is elongate and generally rectangular in cross-section. The top surface 14 of the housing 12 includes buttons 16, which are employed to activate and operate the can opener 10. The top surface 14 also includes a port 18 for receiving the plug of a charger (not shown).

Figure 3:
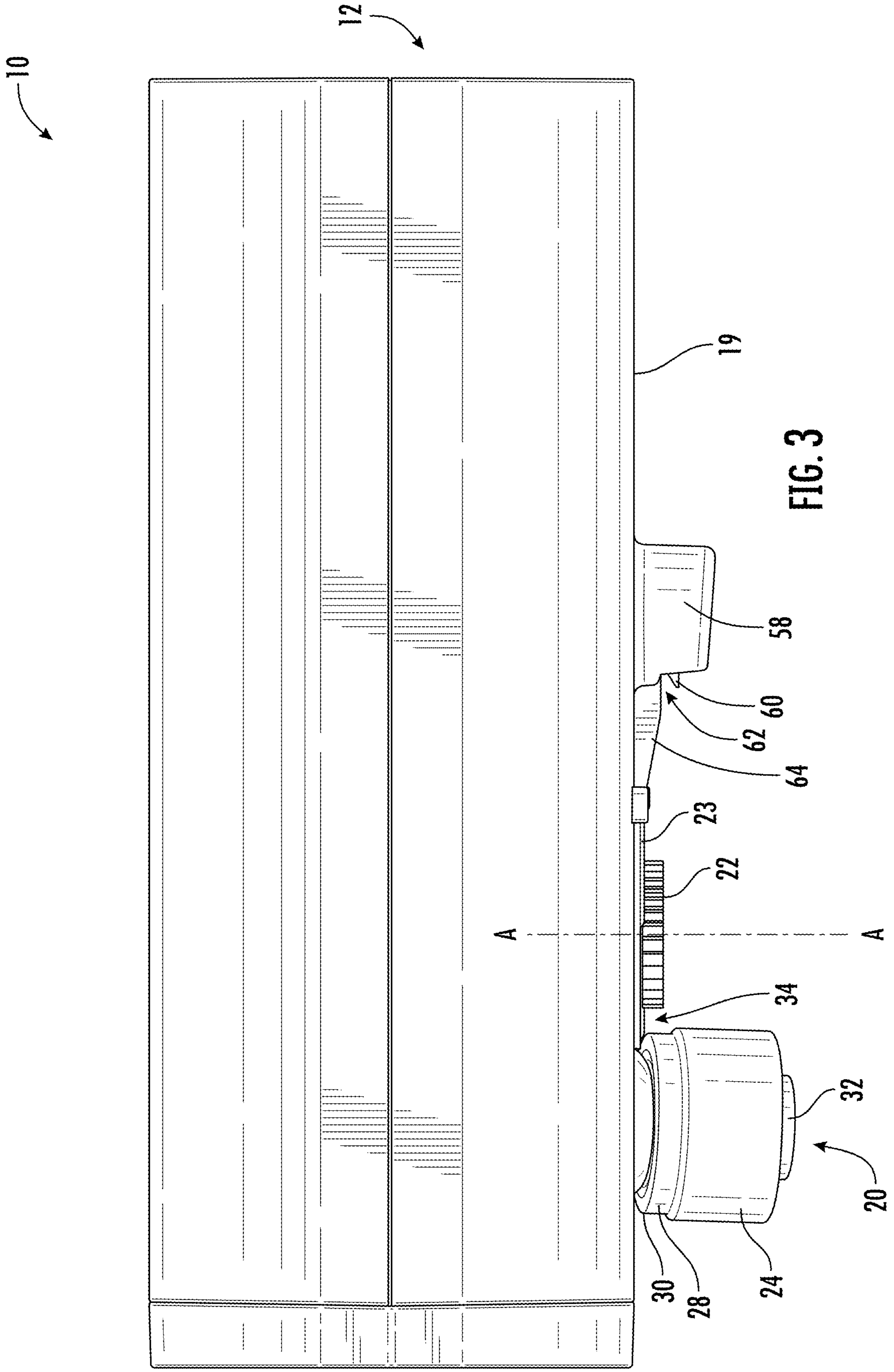
FIG. 3 is a side view of the can opener of FIG. 1.
Figure 4:
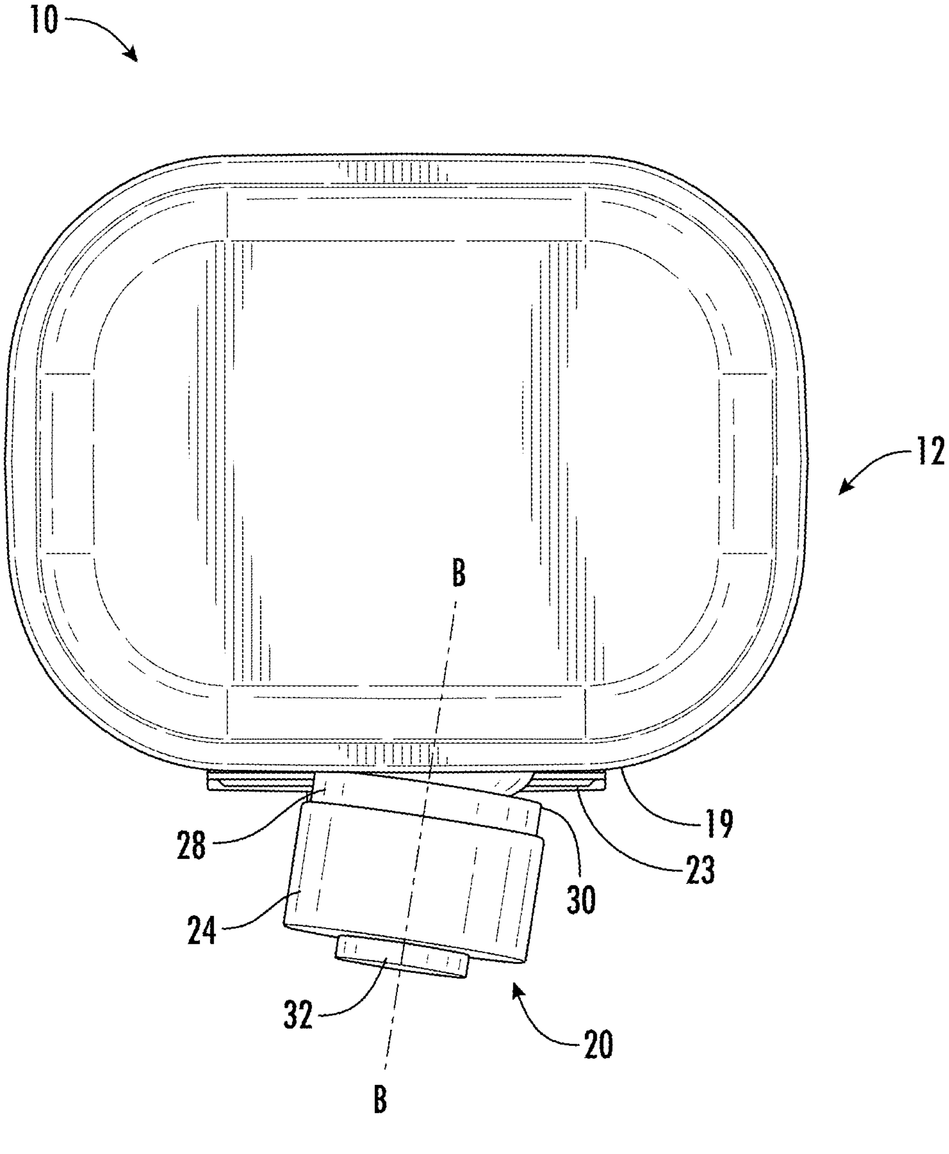
FIG. 4 is an end view of the can opener of FIG. 1.
Figure 5:
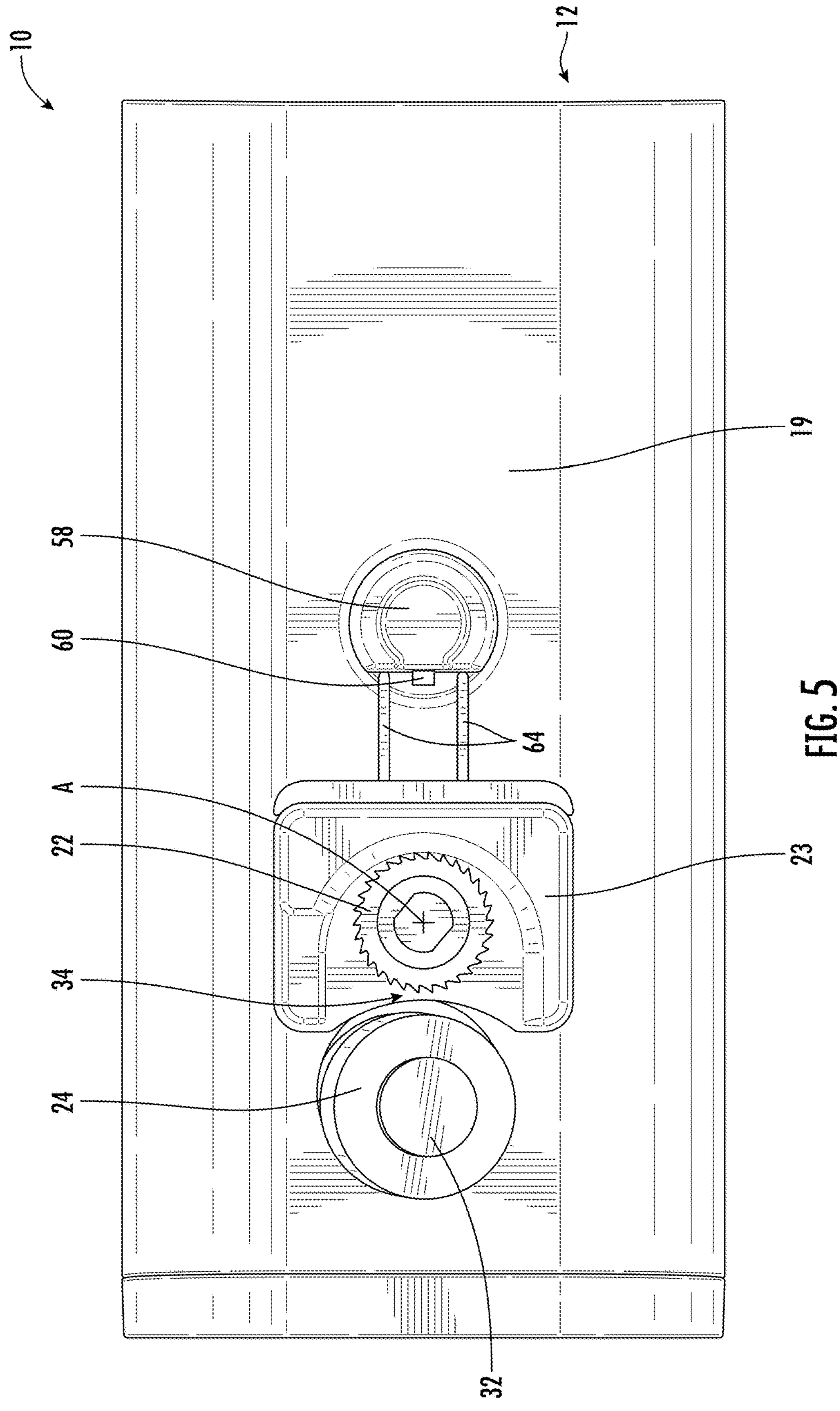
FIG. 5 is a bottom view of the can opener of FIG. 1.

Referring now to FIGS. 3-5, the can opener 10 also includes a cutting wheel 20 and a drive gear 22 that protrude downwardly from the lower surface 19 of the housing 12. The drive gear 22 is mounted to rotate about an axis A1 that is perpendicular to the lower surface 19, and is mounted just below a bearing panel 23. The cutting wheel 20 is generally cylindrical, with a wider lower portion 24 and an upper portion 28 that is slightly narrower than the intermediate portion 24. A blade 30 is located at the upper end of the upper potion 28 and extends radially outwardly. The cutting wheel 20 is mounted on an axle 32 that defines an axis B that is disposed at a slight angle (e.g., 10-20 degrees) relative to vertical. A nip 34 is formed between the cutting wheel 20 and the drive gear 22.

Figure 6:
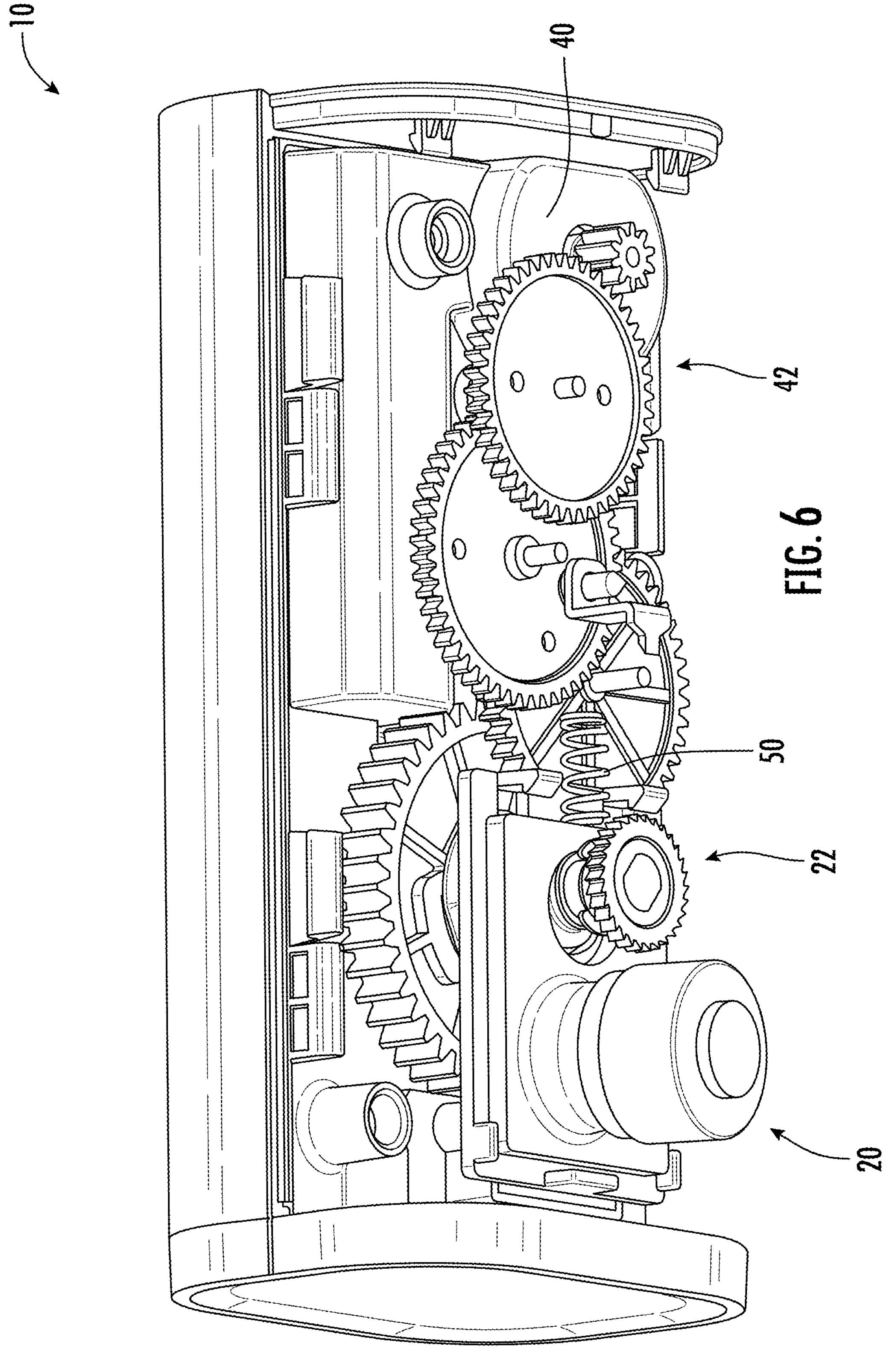
FIG. 6 is a bottom perspective cutaway view of the can opener of FIG. 1.

As shown in FIG. 6, the can opener 10 includes a drive system having a motor 40 located in the rear portion of the housing 12 and a gear train 42 that couples the motor 40 to the drive gear 22. Rotation of the shaft of the motor 40 causes the gears of the gear train 42 to rotate, which in turn rotates the drive gear 22. The gear train 42 is also configured so that, as the gears of the gear train rotate, the cutting wheel 20 is drawn toward the drive gear 22. A spring 50 within the housing 12 is positioned to urge the cutting wheel 20 away from the drive gear 22 when not in operation.

Referring now to FIGS. 3-5, the housing 12 includes a protrusion 58 extends downwardly from the lower surface 19 of the housing 10. A pry lip 60 extends forwardly (i.e., toward the drive gear 22 and the cutting wheel 20) from the protrusion 58. Typically the pry lip 60 is generally parallel with the lower surface 19 of the housing 12 and extends forwardly from the protrusion 58 between about 0.05 and 0.07 inches. Two ribs 64 extend forwardly from the protrusion 58 and above the pry lip 60; the pry lip 60 is separated from the lower surfaces of the ribs 64 by a gap 62 of between about 0.05 and 0.07 inches.

Figure 7:
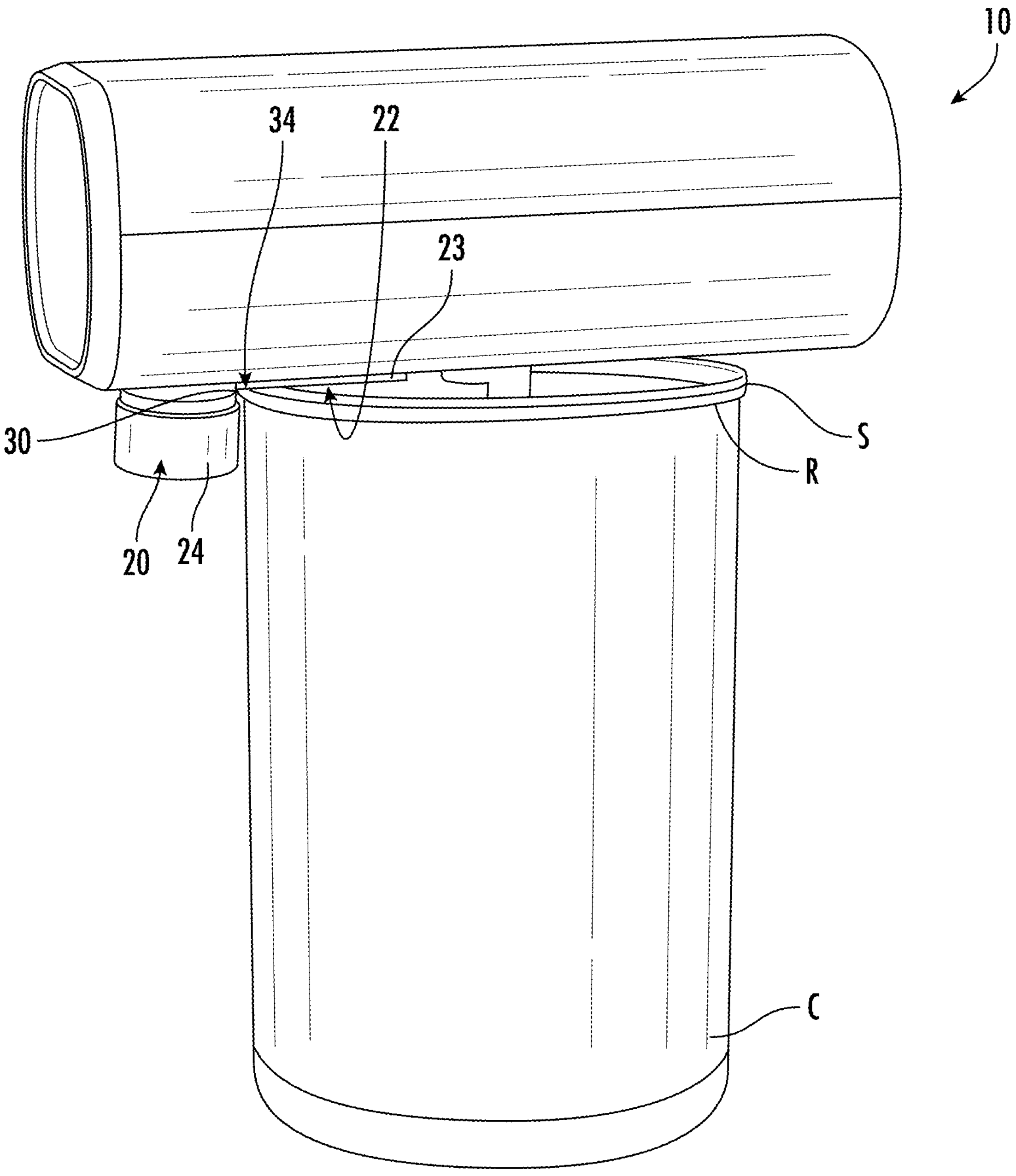
FIG. 7 is a perspective view of the can opener of FIG. 1 in use opening a can.

In operation, a can C to be opened is positioned such that the upper rim R thereof is positioned in the nip 34 between the drive gear 22 and the cutting wheel 20. In this position, the outer surface of the lower portion 24 rests against the outer surface of the can C below the rim R, which places the blade 30 against the side surface of the rim R. The teeth of the drive gear 22 rest against the inner surface of the rim R, thus trapping the rim R in the nip 34 between the drive gear 22 and the cutting blade 30. The bearing panel 23 rests against the upper edge of the rim R of the can C (see FIG. 7).

The can opener 10 is then activated by pushing the activation button 16 on the housing 12. This action activates the motor 40, which, through the gear train 42, rotates the drive gear 22. Because the drive gear 22 is in contact with the inner surface of the rim R of the can C, rotation of the drive gear 22 causes the can opener 10 to revolve relative to the can C. Rotation of the drive gear 22 and accompanying revolution of the can opener 10 also causes the cutting wheel 20 to rotate about the axle 32. Such rotation induces the blade 30 to slice the outer surface of the rim R of the can C and form a seam S in the outer surface of the rim R. This action continues until the can opener 10 has made a full revolution around the rim R of the can C, at which point the rim R has been sliced completely about its entire circumference.

Figure 8:
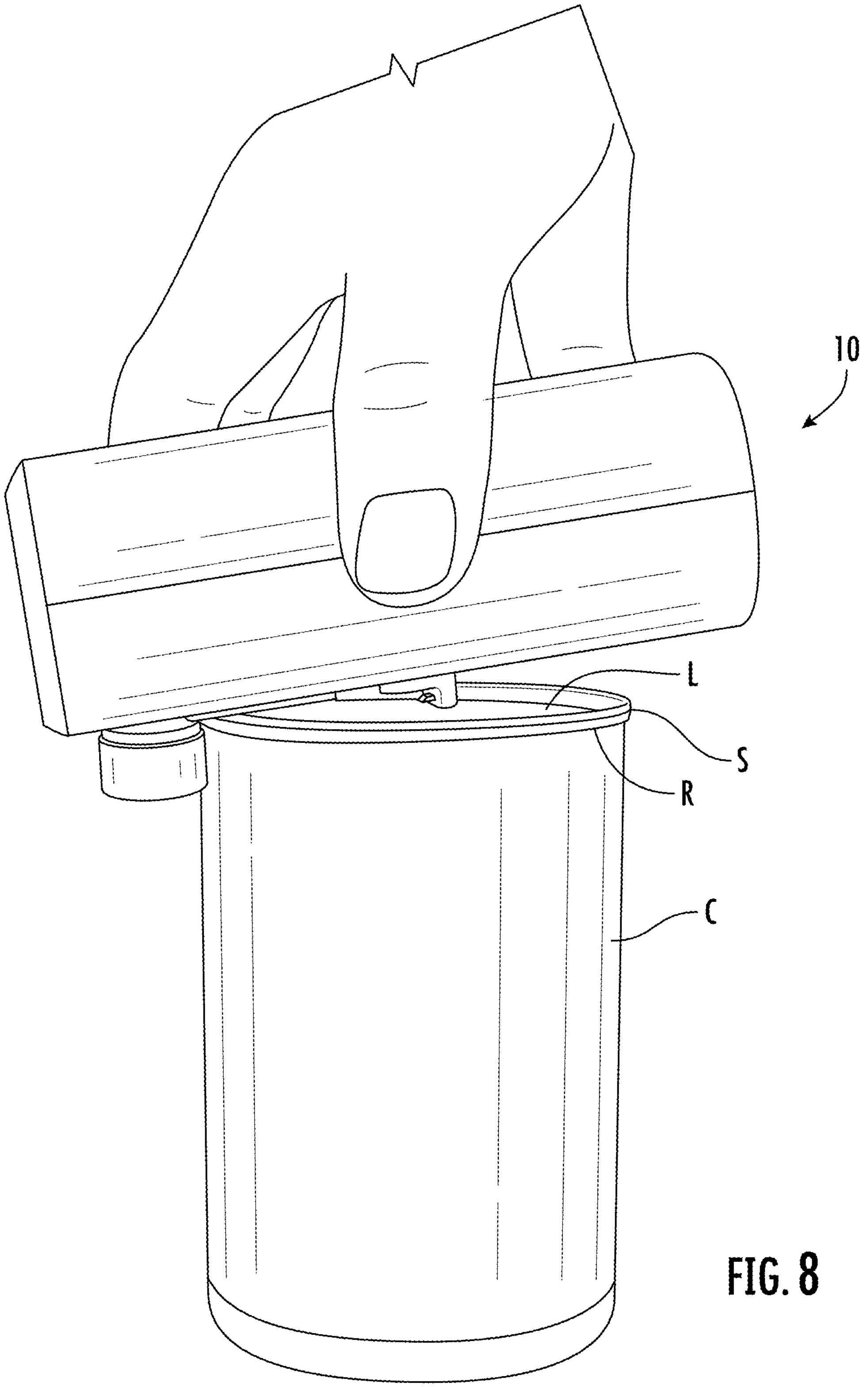
FIG. 8 is a perspective view of the can opener of FIG. 1 with a user removing the can opener after a seam has been formed in the upper rim of the can.
Figure 9:
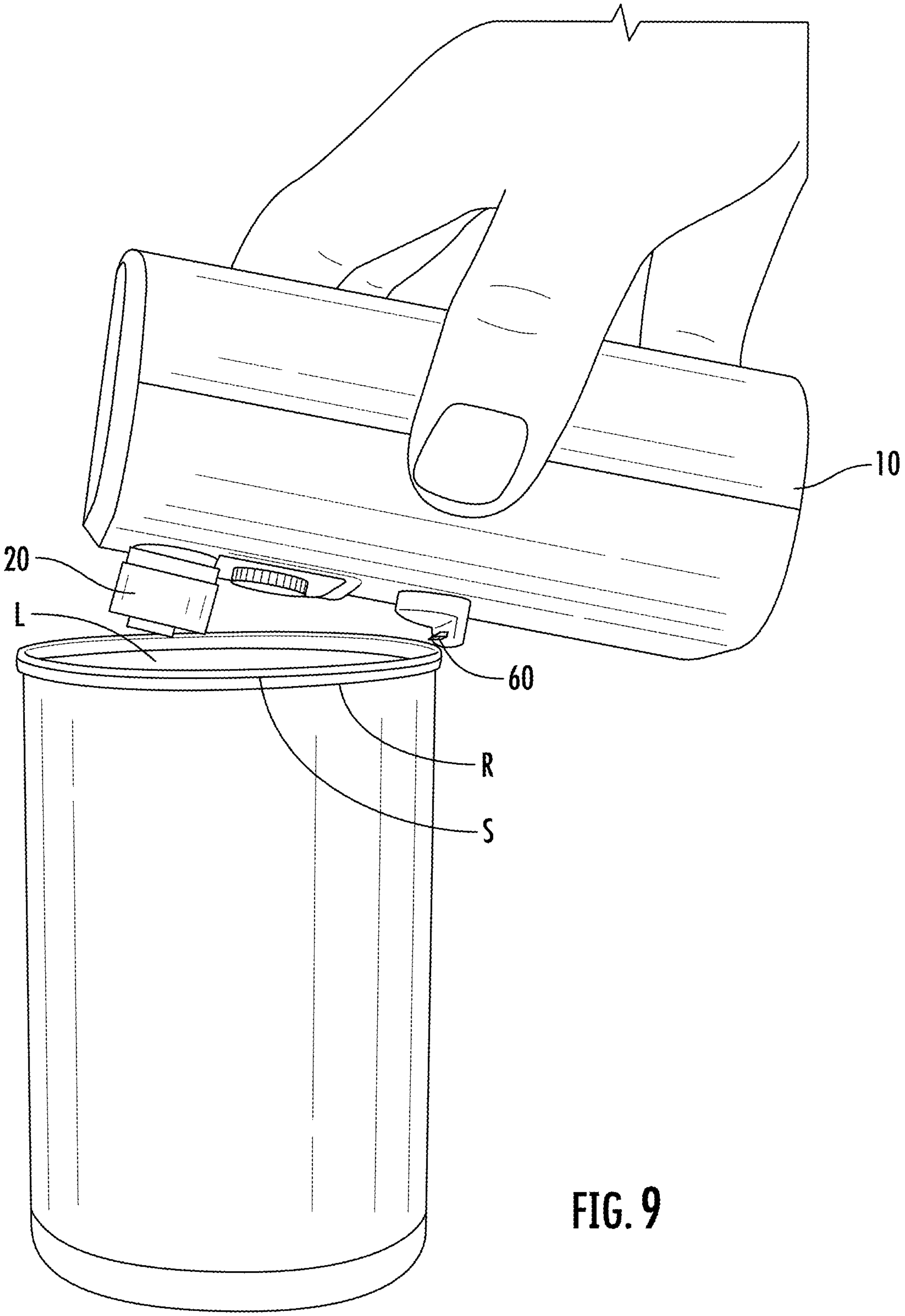
FIG. 9 is a perspective view of the can opener of FIG. 1 showing a user positioning the pry lip in the seam formed in the upper rim of the can.
Figure 10:
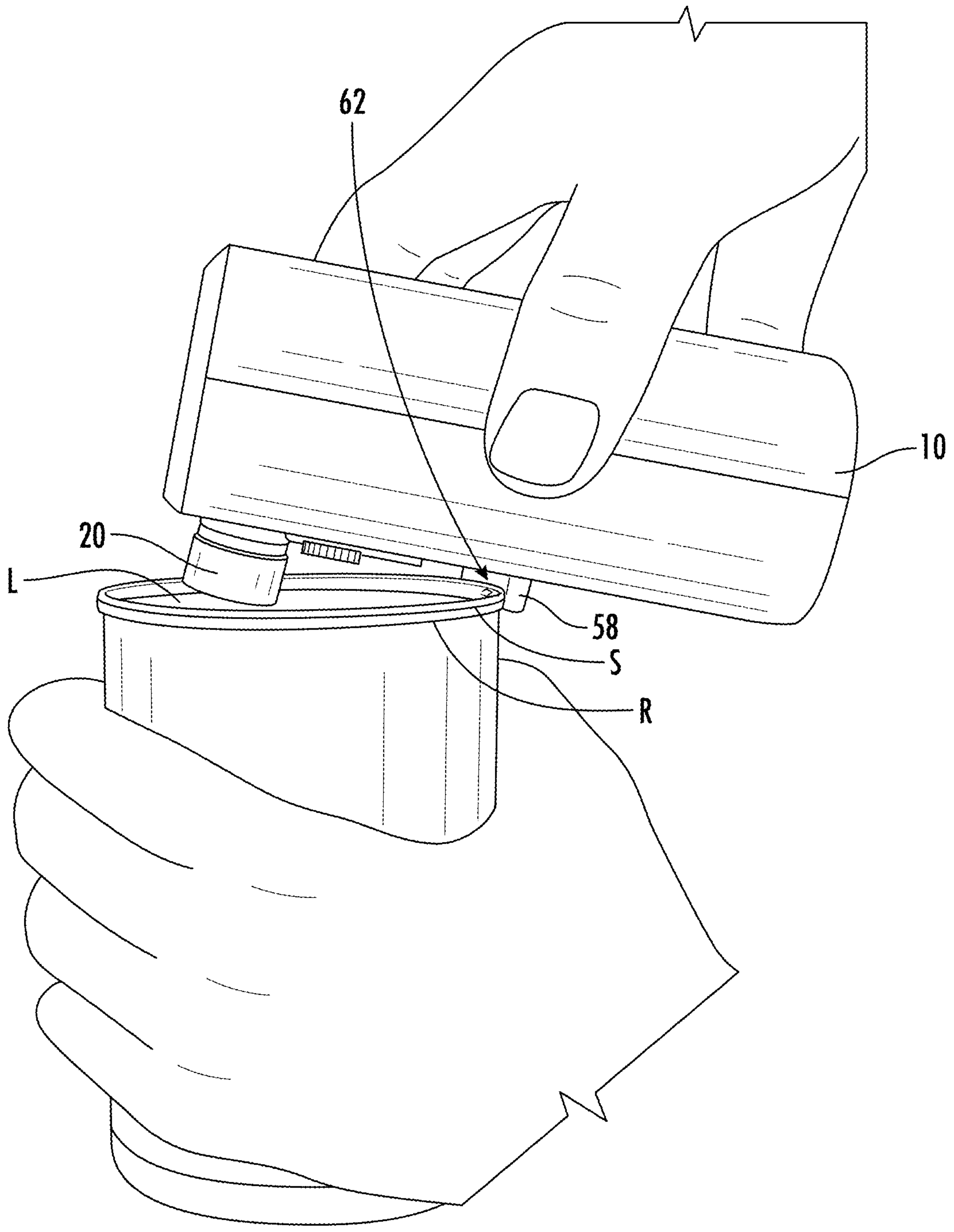
FIG. 10 is a perspective view of the can opener of FIG. 1 with the pry lip positioned in the seam of the can and the cutting wheel engaging the lid of the can.
Figure 11:
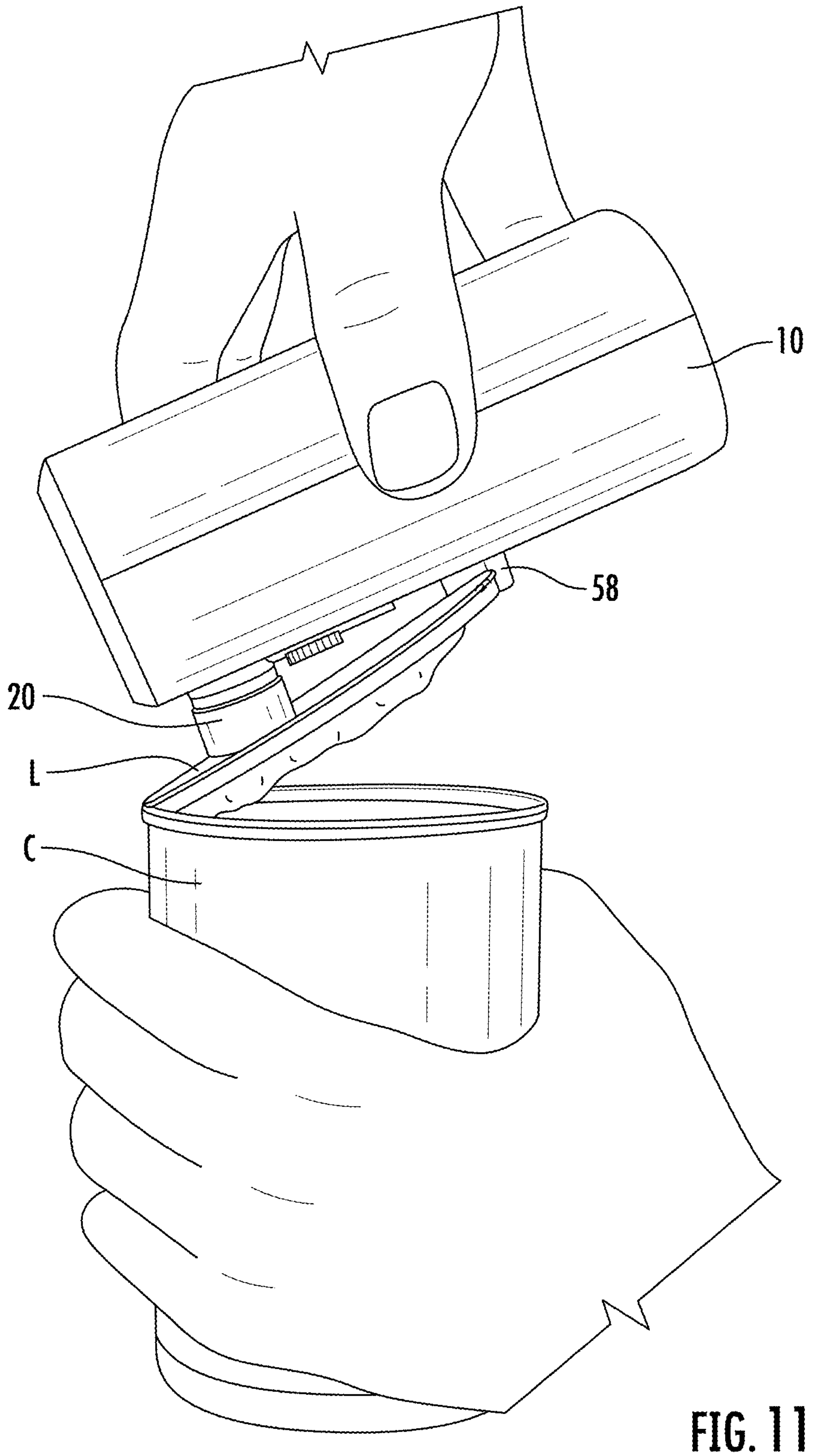
FIG. 11 is a perspective view of the can opener of FIG. 1 illustrating a user prying off of the lid of the can with the can opener.

At this point the user may remove the lid L from the can C. To do so, the user removes the can opener 10 from the can C (FIG. 8) and positions the can opener 10 such that the lower surface of the cutting wheel 20 rests against the upper surface of the lid L. The can opener 10 is then shifted so that the pry lip 60 of the protrusion 58 of the can opener is inserted in the seam S formed by the blade 30 (FIGS. 9 and 10). With the pry lip 60 inserted into the seam S (such that the lid L of the can C is inserted into the gap 62) and the cutting wheel 20 resting against the upper surface of the lid L, the rear end of the can opener 10 can be raised, thereby pivoting the can opener 10 about a fulcrum/pivot point provided by the lid L and remaining rim R of the can C, with the cutting wheel 20 providing control and stability to the movement (FIG. 11). This action enables the pry lip 60 to pry the lid L from the can C.

Those of skill in this art will appreciate that the can opener 10 may take different forms. For example, the gear train 42 may differ (i.e., it may contain more or fewer gears), or it may be replaced by a different assembly for inducing rotation in the drive gear 22. The motor 40 may be located differently. Also, in the illustrated embodiment the motor 40 is driven by batteries (which may be disposable or rechargeable), but may also be driven via AC current supplied via a power cord. In the illustrated embodiment, the drive gear 22 has teeth, but in other embodiments the drive gear 22 may have a smooth or textured surface. Other variations may also be suitable for use.

In addition, the pry lip 60 may take different configurations. In the illustrated configuration, the pry lip 60 is located between about 1.50 and 1.65 inches from the center of the cutting wheel 20, which can locate the cutting wheel 20 at a desirable location for prying on many different can sizes. In such embodiments, the pry lip 60 should be located relatively close to the lower surface 19 of the housing 12, so that when the can opener 10 is cutting open the can, the pry lip 60 (which is positioned directly above the lid of the can) does not engage or interfere with the lid. In other embodiments the pry lip 60 may be located differently relative to the cutting wheel 20. It may also be understood that for very small cans, the cutting wheel 20 may be located outside of the circumference of the lid when the pry lip 60 engages the lid.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An automated can opener, comprising:

a housing having upper and lower surfaces;

a cutting wheel rotatably mounted relative to and extending downwardly from the lower surface of the housing, the cutting wheel including a circumferential blade, the cutting wheel mounted to rotate about a first axis that is generally normal to the lower surface;

a drive gear rotatably mounted relative to and extending downwardly from the lower surface of the housing, the drive gear forming a gap with the cutting wheel, the gap sized to receive a raised rim of a can;

a drive system residing in the housing and coupled to the drive gear to rotate the drive gear about a second axis that is substantially normal to the lower surface; and a pry lip mounted to the lower surface of the housing and extending toward the drive gear, the pry lip configured to be inserted into a seam cut into the rim of the can and the cutting wheel positioned such that, when the pry lip is inserted into the seam, the cutting wheel engages a lid of the can.

2. The can opener defined in claim 1, wherein the pry lip is between about 1.50 and 1.65 inches from a center of the cutting wheel.

3. The can opener defined in claim 1, wherein the pry lip forms a gap of between about 0.05 and 0.07 inches with the housing.

4. The can opener defined in claim 1, wherein the cutting wheel includes a wider lower portion and a narrower upper portion.

5. The can opener defined in claim 4, wherein the circumferential blade is located on the upper portion.

6. The can opener defined in claim 5, wherein the lower portion is positioned to engage a side wall of a can during opening of the can.

7. A method of opening a can, comprising:

(a) providing a can having a side wall, a lid, and a raised rim that encircles the lid, the raised rim having a circumferential outer surface;

(b) providing an automatic lateral cutting can opener, comprising:

a housing having upper and lower surfaces;

a cutting wheel rotatably mounted relative to and extending downwardly from the lower surface of the housing, the cutting wheel including a circumferential blade, the cutting wheel mounted to rotate about a first axis that is generally normal to the lower surface;

a drive gear rotatably mounted relative to and extending downwardly from the lower surface of the housing, the drive gear forming a gap with the cutting wheel, the gap sized to receive a raised rim of a can;

a drive system residing in the housing and coupled to the drive gear to rotate the drive gear about a second axis that is substantially normal to the lower surface; and a pry lip mounted to the lower surface of the housing and extending toward the drive gear, the pry lip configured to be inserted into a seam cut into the rim of the can;

(c) engaging the raised rim with the blade of the cutting wheel and the drive gear;

(d) revolving the can opener relative to the can to form a seam in the outer surface of the raised rim of the can;

(e) inserting the pry lip into the seam while engaging the lid with the cutting wheel; and (f) raising the pry lip as the cutting wheel remains engaged with the lid to dislodge the lid of the can from the side wall.

8. The method defined in claim 7, wherein during step (d), the pry lip is positioned directly above the lid of the can.

9. The method defined in claim 7, wherein the cutting wheel includes a wider lower portion and a narrower upper portion.

10. The method defined in claim 9, wherein the circumferential blade is located on the upper portion.

11. The method defined in claim 10, wherein step (d) further comprises engaging the side wall of the can with the lower portion.

* * * * *